(12) United States Patent
Daris et al.

(10) Patent No.: US 7,681,400 B2
(45) Date of Patent: Mar. 23, 2010

(54) EXHAUST ASSEMBLY FORMING A HORIZONTAL PROPULSION GAS ELBOW IN AN AIRCRAFT

(75) Inventors: Thomas Daris, Paris (FR); Jackie Raymond Julien Prouteau, Villecresnes (FR); Frederic Henri Paul Schenher, La Chapelle Gauthier (FR); Edgar Brunet, Neuilly sur Seine (FR)

(73) Assignee: SNECMA, Paris (JP)

( * ) Notice: Subject to any disclaimer, the term of this patent is extended or adjusted under 35 U.S.C. 154(b) by 364 days.

(21) Appl. No.: 11/741,393

(22) Filed: Apr. 27, 2007

(65) Prior Publication Data

US 2007/0251211 A1  Nov. 1, 2007

(30) Foreign Application Priority Data

Apr. 28, 2006 (FR) .................................. 06 51542

(51) Int. Cl.
*F02K 1/00* (2006.01)

(52) U.S. Cl. .................................. 60/770; 239/265.25

(58) Field of Classification Search ................... 60/770, 60/230; 239/265.25, 265.35
See application file for complete search history.

(56) References Cited

U.S. PATENT DOCUMENTS

| 2,420,323 A | * | 5/1947 | Meyer et al. ................... 244/52 |
| 2,664,700 A | * | 1/1954 | Benoit .................... 239/265.25 |
| 3,981,448 A | | 9/1976 | Demogenes et al. |
| 5,170,964 A | | 12/1992 | Enderle et al. |
| 6,112,513 A | | 9/2000 | Catt et al. |
| 2002/0189232 A1 | | 12/2002 | Weiland et al. |

OTHER PUBLICATIONS

U.S. Appl. No. 11/741,346, filed Apr. 27, 2007, Brunet, et al.
U.S. Appl. No. 11/741,338, filed Apr. 27, 2007, Brunet, et al.

* cited by examiner

*Primary Examiner*—Michael Cuff
*Assistant Examiner*—Vikansha S Dwivedi
(74) *Attorney, Agent, or Firm*—Oblon, Spivak, McClelland, Maier & Neustadt, L.L.P.

(57) ABSTRACT

A propulsion gas exhaust assembly in an aircraft propelled by hot gases produced along an axis of the aircraft by a gas generator is disclosed. The propulsion gas exhaust assembly includes a transition element emerging in two duct elements each communicating with an ejection half-nozzle, wherein each of the two duct elements forms an elbow downstream of the transition element.

18 Claims, 3 Drawing Sheets

EXHAUST ASSEMBLY FORMING A HORIZONTAL PROPULSION GAS ELBOW IN AN AIRCRAFT

The invention relates to the field of aircraft propulsion by ejection of gas flows, and relates to the exhaust assembly downstream of the gas generator up to the nozzle.

BACKGROUND OF THE INVENTION

For aircraft propelled by turbojets, with or without pilot, drones, for military applications, one objective is stealth.

Stealth is defined in particular in relation to two parameters: the radar cross section (RCS) and the infrared signature (IRS). The RCS is the surface area likely to appear on a radar, taking account of the geometry of the aircraft. The IRS is the heat signature that the aircraft leaves, particularly at its ejection nozzles.

DESCRIPTION OF THE PRIOR ART

To reduce this heat signature, or even delete it, it is a known practice to mask the infrared radiation emitted by the hot gases exiting the gas generator. For example U.S. Pat. No. 3,693,880 is known that describes a device of this type. It comprises a screen in the shape of a body of revolution placed in the gas exhaust channel while being at a distance from the walls of the latter and held by radial arms. It has an aerodynamic shape guiding the gases in the best way possible along its ovoid profile and its surface is cooled by the colder air carried by the radial arms. The cylindrical duct becomes annular between the screen and the wall of the duct. The flow again becomes cylindrical downstream of the screen to be exhausted through a nozzle. The diameter of the duct becomes larger at this location and follows a profile parallel to that of the screen to conserve a sufficient opening. The maximum diameter of the screen is sufficient to mask the turbine from view from the rear. In addition the downstream portion of the screen has a double wall traversed by the cooling air in order to prevent any heating thereof.

The present applicant has furthermore developed a double nozzle, called a bifid nozzle, in which the gas flow exiting from the gas generation means is divided into two flows and guided to two nozzles. The two flows of equal size are ejected in parallel in the axis of the thrust. The advantage of this arrangement is to allow the guidance of the aircraft, particularly in yaw by a control of the two flows either by orientation of their thrust vector or by the delivery rates. Being separated from one another, they are also offset from the axis of the generator. In this manner, in the case where the generator means comprises a turbine, the latter is capable of being invisible from the rear through the opening of the nozzles. The infrared signature is therefore small.

SUMMARY OF THE INVENTION

The subject of the present invention is an exhaust device whose infrared signature is further reduced relative to the former solution.

The invention succeeds in achieving this objective with a propulsion gas exhaust assembly, in an aircraft propelled by hot gases produced along the axis of the latter by a gas generator, comprising a transition element emerging in two duct elements each communicating with an ejection half-nozzle, wherein each of the two duct elements forms an elbow downstream of the transition element in such a manner that the elements inside the duct that lie upstream of the elbow are not visible from the rear.

In the present application, the term "elbow" is understood in the following manner. Each duct element, tubular in shape, comprises a first portion guiding the gas flow in a radial direction away from the axis and a second portion downstream of the first, guiding the gas flow in a radial direction toward the axis. Downstream of the elbow, the flow is returned to the axis.

Advantageously, the two elbows are symmetrical with respect to each other and more particularly lie in the same plane. The invention applies especially to an aircraft propelled by at least one gas generator consisting of a turbojet. This may be of the single-flow or multiple-flow type.

Surprisingly, it has been found that by bending the two gas flows in this manner it was possible to effectively mask not only the disk of the turbine but also the hottest portions downstream of the latter. Furthermore, this concept also makes it possible to produce a transition element minimizing the aerodynamic pressure drops while favoring the mixture of the gases before ejection.

Thus, the exhaust assembly comprises a transition element with an upstream cylindrical portion of especially circular cross section communicating toward the downstream with the two ducts. Preferably, the cross section of the transition element changes toward the downstream until forming two adjacent elliptical cross sections. Advantageously, these two ellipses may have a vertical or horizontal major axis.

The invention also relates to the guidance capability supplied by this type of exhaust. The solution described in the patent application filed by the present applicant under number FR 0551857 has been applied. Specifically, in the case of a nozzle as intended to be fitted to a military drone, an objective of IRS and RCS stealth is linked with the need for vectored thrust. This leads to designing flat two-dimensional nozzles, which can have an elongation of the order of 5 for IRS and RCS stealth and with a pointed external shape for RCS stealth.

A further object of the present invention is the production of an aircraft controlling device, particularly for controlling an aircraft in yaw, that is effective and is associated with a control of the engine delivery rate.

This device must be applicable to single-engined or twin-engined aircraft and in particular to drones.

This device must be capable of continuously providing a low amplitude vectorization without causing a gas generator performance penalty.

It must be capable of providing a major vectored thrust for the needs of controlling the aircraft.

These objectives can be met with the exhaust assembly of the invention, which is shaped so as to divide a main propulsion gas flow into a first and a second flow for an ejection into a first and a second half-nozzle and comprising at least one of the following two controlling means: a means of distributing the main flow into each of the two half-nozzles and a means of orienting the thrust vector produced by each of the two half-nozzles.

"Half-nozzle" means, in the present application, a gas ejection nozzle that receives a portion of the main flow downstream of the turbine. This term is not associated with a particular shape. Use is made of the two-flow solution to separately control the two half-thrust vectors in modulus and in orientation.

Advantageously, at least one of said two means, preferably both, use fluid injection and still preferably the exhaust assembly comprises said two means. This solution has the advantage of being simple and of operating with a reduced number of fluid injection devices, ensuring a high reliability and low cost. However, the means of controlling the two flows may be mechanical.

In the first place, said half-nozzles are placed for a yaw orientation of the thrust vector. In this way the absence of a vertical stabilizer is alleviated.

According to one variant, said half-nozzles are placed for a pitch or roll control or else the nozzle comprises two pairs of half-nozzles, for example one for the yaw orientation, the other for the pitch orientation. Other arrangements or combinations are possible.

According to another feature, the means for controlling the distribution of the flows comprises means for fluid injection at the throat of each of the half-nozzles. More precisely, the gas generator being a turbojet, the fluid injection means are supplied by the air that can be tapped from the compressor of the generator. This solution is particularly advantageous because it allows a balanced operation in all the flight phases. Particularly, a nozzle operation procedure is planned according to which the air is continuously tapped from the generator compressor.

According to a variant embodiment, the main flow is generated by two gas generators. In this case, the exhaust assembly preferably comprises only one means of orienting the thrust vector produced by each of the two half-nozzles.

BRIEF DESCRIPTION OF THE DRAWINGS

The invention is now described in greater detail with reference to the appended drawings in which.

DESCRIPTION OF THE PREFERRED EMBODIMENTS

Figure 1:
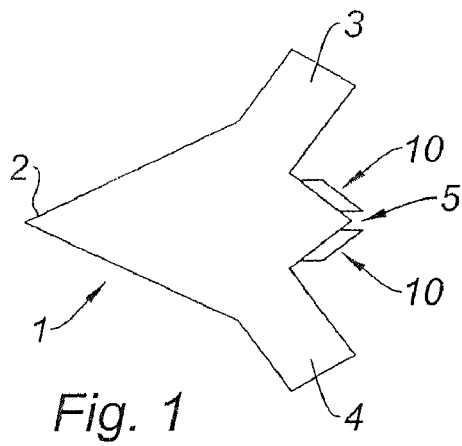
FIG. 1 shows in a top view an example of an aircraft to which the invention is applied.

The aircraft 1 represented in the figure is a nonlimiting example. It has a nose 2, two wings 3 and 4 and is propelled by one or two turbojets that are not visible. It is shaped so as to have the smallest possible RCS and IRS. Its rear portion in particular has no vertical stabilizer and terminates in a point 5 with an appropriate apex angle, for example 40°, to reject the radar waves to infinity. The exhaust assembly 10 participates in this requirement by being bifid. It distributes the main flow exiting the channel 12 at the entrance into two flows in two symmetrical channels 12A and 12B that terminate in two half-nozzles 14 and 16 of rectangular section. The channels 12, 12A and 12B have a shape suitable for ensuring the separation of the flow into two flows but also the transition from a circular or substantially circular section cylindrical shape to a rectangular section shape. Where appropriate, the channels include an additional elbow for masking the turbine. As may be seen in the figures, this masking is already at least partly provided by the separation between the half-nozzles 14 and 16.

Figure 2:
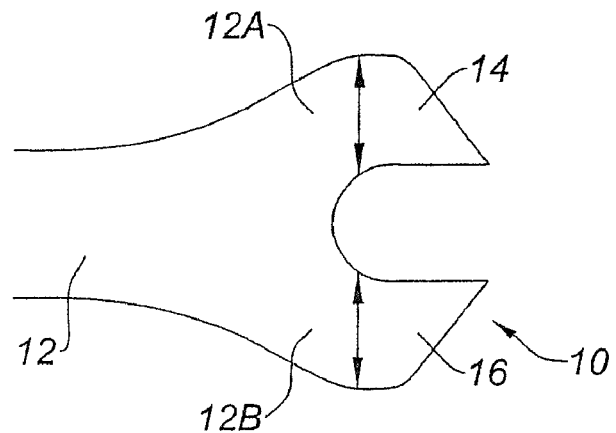
FIG. 2 shows in a top view a nozzle of the bifid type as described in patent application FR 05 51 857.

According to the present application, the shape of the exhaust assembly is enhanced so as to ensure the masking of the turbine block irrespective of the position of a rear observer. As may be seen in FIG. 2, one portion of the bifid nozzle, because of its beveled ejection plane, is visible when viewed from the side. This also reduces its signature.

With reference to FIGS. 3 to 7, the geometry of the exhaust assembly 20 according to the invention can be seen.

This assembly comprises a transition element 21 with a cylindrical upstream portion 21A, of circular or other cross section. The transition element emerges in a first duct element 22 and a second duct element 23, these two being parallel. The two duct elements each terminate in a respective half-nozzle 24 and 26.

Figure 7:
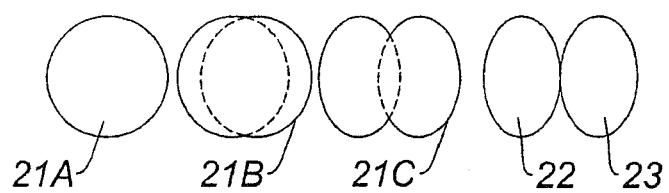
FIG. 7 shows the shape of the cross section of the exhaust assembly on sections VIIa-VIIa, VIIb-VIIb, VIIc-VIIc and VIId-VIId respectively.

The upstream portion 21A communicates directly with the exit of the gas generator (not shown), such as a turbine of a gas turbine engine. As may be seen in FIG. 7, its cross section is preferably circular. However, it may deviate therefrom. The shape changes from the entrance 21A. FIG. 7 shows two shapes 21B and 21C corresponding to intermediate planes of section between the entrance and the separation into two duct elements 22 and 23.

The shape of the transition element progressively changes toward the downstream so as to adopt the contour 21B consisting of two ellipses, which partially overlap, as may be seen in the plane of section VIIb-VIIb. The two ellipses, which are identical, here have a vertical major axis. On going toward the downstream, they progressively move apart until adopting the outline at 21C of two ellipses, as may be seen in the plane of section VIIc-VIIc. The separation takes place in the plane of section VIId-VIId.

On moving axially downstream, the two ducts each form an elbow. They progressively move apart and deflect the gas flows radially toward the outside until reaching a maximum separation at 22M and 23M where the flows become axial. Downstream, they converge on each other, deflecting the flows radially toward the axis until reaching 22N and 23N where they are returned to the axis. At this point, the separation between the two ducts is still sufficient to correspond substantially to that of the diameter of the entrance plane 21A. Each duct terminates in a half-nozzle, 24 and 26 respectively, which diverges downstream of the throat that lies in the plane 22N-23N. Here they have a rectangular cross section, but other shapes are possible. The shape of the cross sections of the ducts 22 and 23 progressively changes until they have the shape of the half-nozzles. The areas are determined according to the requirements of the fluid dynamics.

Preferably, the assembly has at least one of the following dimensional relationships:

$L_{elbow}/L_{channel}$ is between 0.5 and 0.7;

$L_{int}/L_{ext} \geq \frac{1}{2}$;

$L_{int}/L_{channel}$ close to $\frac{1}{3}$;

$L_{ext}/L_{channel} \geq \frac{1}{2}$;

$L_{separation}/L_{channel} \leq 0.3$, where:

$L_{elbow}$ is the length measured axially from the entrance plane 21A to the point where the elbow is at its maximum lateral deviation from the axis;

$L_{channel}$ is the length measured axially from the entrance plane 21A to the throat of the half-nozzles;

$L_{int}$ is the width of the elbow measured transversely from the engine axis to the internal wall of the duct, at the point where the duct element is at its maximum departure;

$L_{ext}$ is the width of the elbow measured from the axis to the external wall of the duct, at the point where the duct element is at its maximum departure; and $L_{separation}$ is the length measured along the engine axis from the entrance plane 21A to the plane of section VIId-VIId.

As illustrated by the straight lines D1 and D2, such a geometry allows effective masking of the hot zones of the engine and in particular the zones of the transition elements through which the gas flow passes. These straight lines constitute the limits of visibility of these zones.

Figure 8:
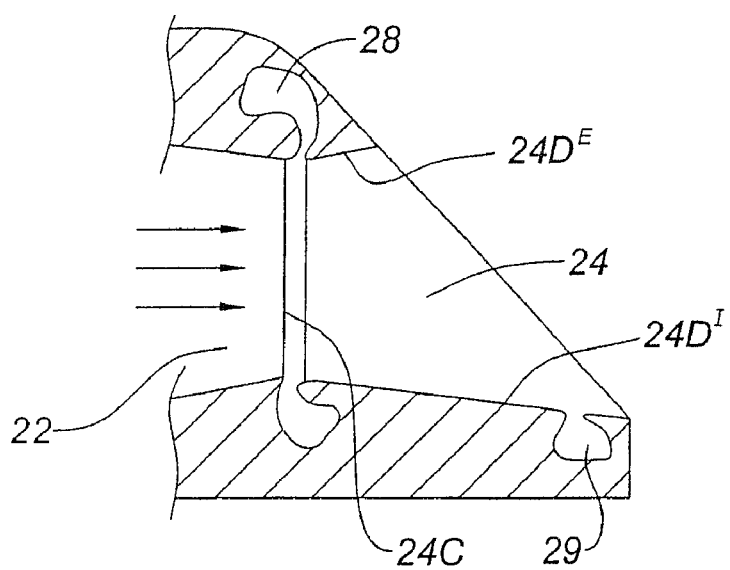
FIG. 8 is a schematic representation of the arrangement of the control means of the invention in a half-nozzle.
Figure 3:
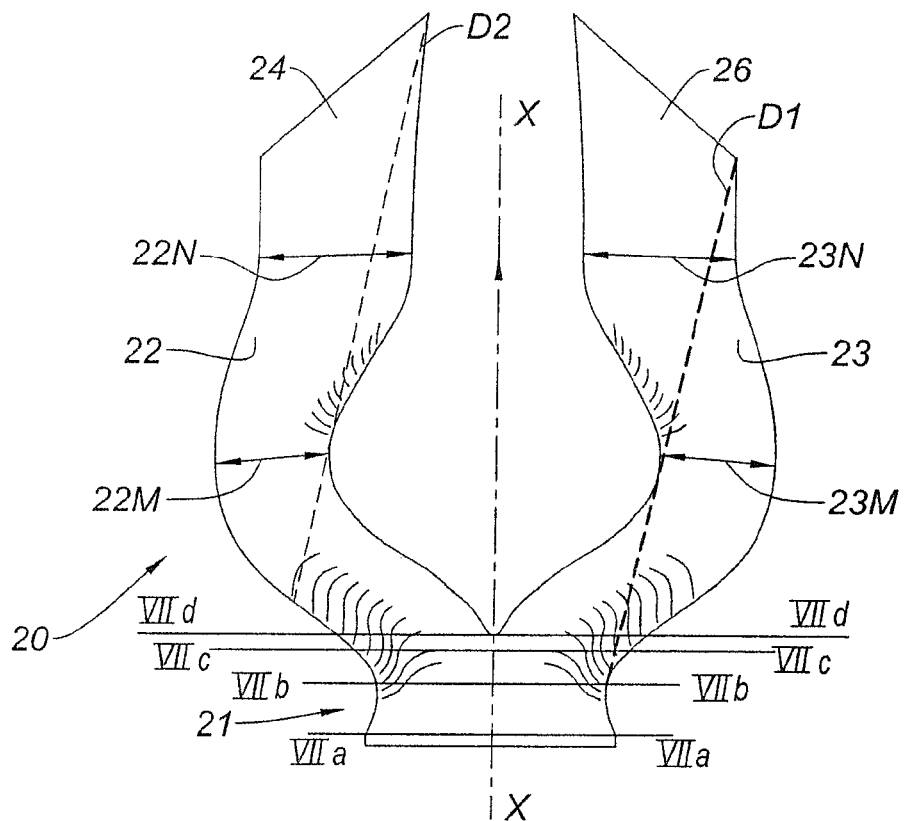
FIG. 3 shows, in a top view, an exhaust assembly according to the invention.
Figure 4:
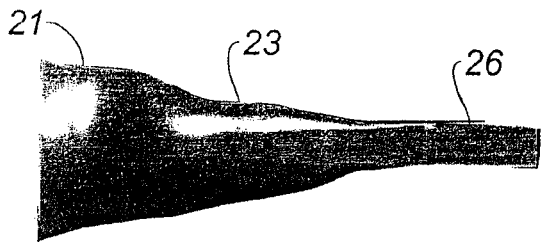
FIGS. 4 to 6 show the assembly of FIG. 3 seen respectively from the side, from behind and in rear three-quarter perspective.
Figure 5:
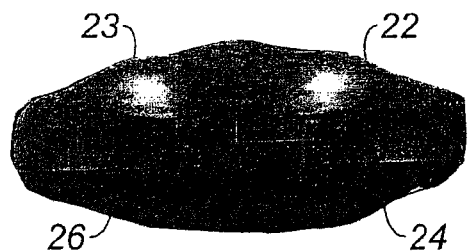
Figure 6:
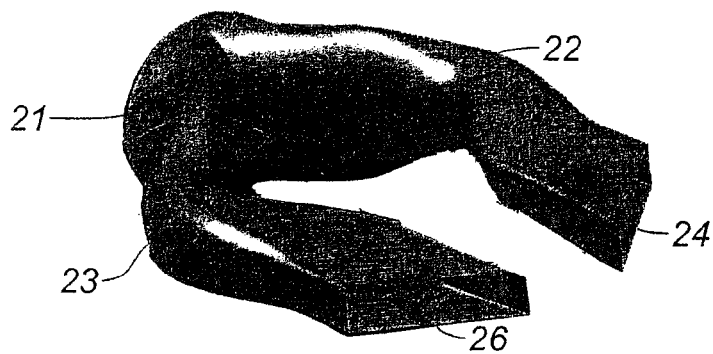
Figure 9:
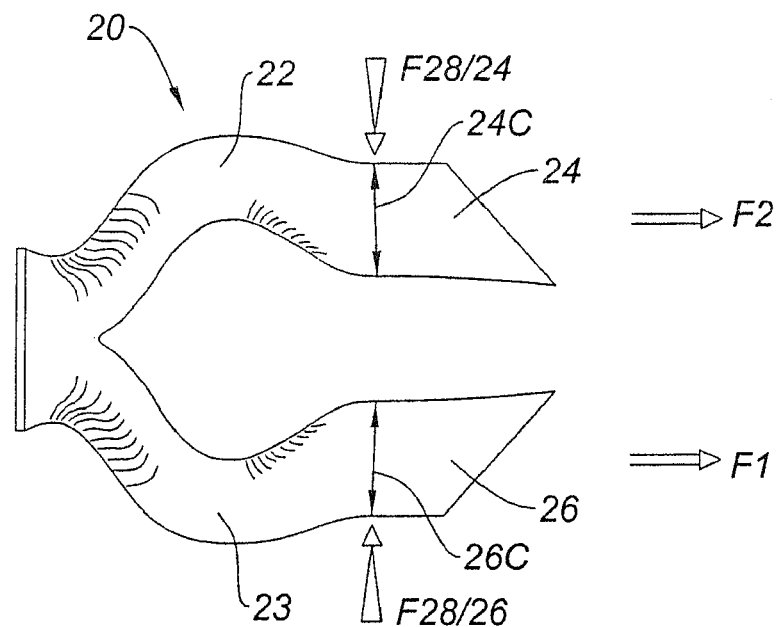
FIG. 9 illustrates the operation of the control means placed at the throat.
Figure 10:
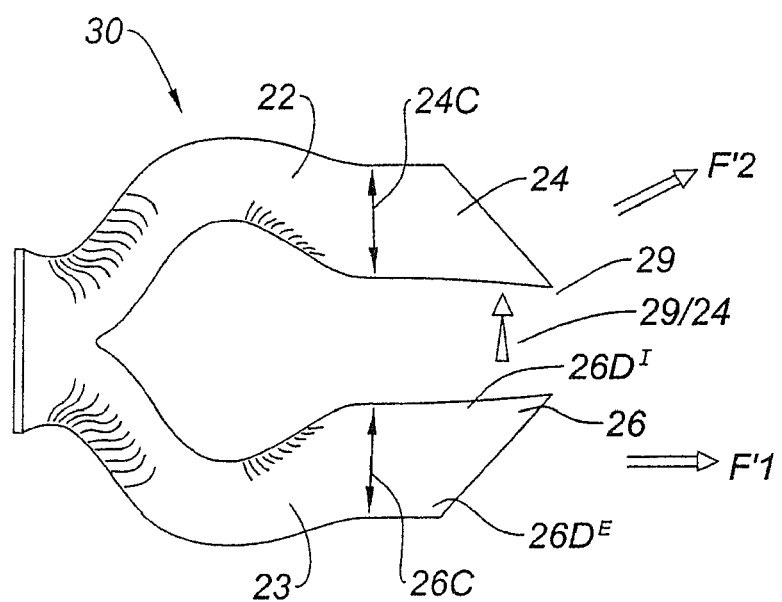
FIG. 10 illustrates the operation of the control means placed in the divergence of the half-nozzles.

The means of yaw guidance of the aircraft will now be described with reference to FIGS. 8 to 10. In this example, each of the half-nozzles consists of a rectangular throat, 24C and 26C respectively, with a high horizontal elongation, width/height ratio, as seen in FIG. 8. The elongation of the nozzles may be 2.5. Downstream of the throat, the divergence is formed by two vertical walls. It is short on the external side $24D^E$ and $26D^E$. The vertical walls on the internal side $24D^I$ and $26D^I$ are longer. This gives a beveled shape of the downstream edge of the nozzles, 24 and 26. The top and bottom walls are either parallel with one another or divergent.

The assembly is preferably optimized to provide, in the cases with no injection and no vectorization, a minimum transverse thrust of each half-nozzle. Specifically, the latter results in a loss of axial thrust that must be reduced to a minimum. The overall lateral thrust remains zero because of the symmetry of the system.

According to a feature of the invention, to provide the guidance of the aircraft 1 without a tail unit, control means are provided by which action is taken on the two flows. These control means may be mechanical or fluidic.

The convergent-divergent nozzle, for example 24, comprises the throat 24C and downstream the two divergent walls $24D^I$ and $24D^E$. Here the nozzle comprises a fluid injector 28 placed on a wall at the throat and a fluid injector 29 situated on the wall $24D^I$ of the divergence. The injector is preferably situated close to the end of the divergence.

In a symmetrical manner, the half-nozzle 26 is fitted with a fluid injector 28 at the throat 26C and a fluid injector 29 on the wall of divergence $26D^I$.

The injectors 28 and 29 are advantageously supplied with air tapped from the turbojet compressor that supplies the main flow, as appropriate.

Operation is as follows. FIG. 9 shows by arrows 28/24 and 28/26 the air injections via the injectors 28. The yaw moment is created by controlling the distribution of the delivery rate in each of the two half-nozzles 24 and 26 by means of fluid injections at the two throats. The value of the delivery rate is illustrated by the length of the arrow, and here one arrow is longer than the other. According to this example, the half-nozzle 24 receives a strong injected delivery rate 28/24, and consequently sustains a major restriction of the effective section at the throat. Conversely, the half-nozzle 26 receives little or no delivery rate at the throat. The result of this is the creation of an axial thrust differential. The thrust F1 on the half-nozzle 26 is greater than the thrust F2 on the half-nozzle 24. The result of this is a yaw moment.

It is observed however that a sudden obstruction of the nozzle would instantaneously create an increase in pressure in the channel and a risk of pumping the compressor. According to a preferred operating mode, a nominal permanent injection is created. This is done at equal delivery rate tapped off in such a way that the generator does not undergo a sudden variation during the mission while regulating the nozzle at total equal effective section at the throat. The thermodynamic cycle of the engine is directly optimized under this constraint of constant tapping. In this manner, the system of regulating the tapped air operates continuously and does not undergo any transitional startup phase.

Therefore this operating mode in accordance with the invention provides, with a low impact on the performance of the engine, a vectored thrust that makes it possible to compensate for the absence of cell tail unit, particularly for cruising or slow transitional speeds.

The operation of the injection device situated in the divergence of the nozzles 24 and 26 is now described with reference to FIG. 10.

The injectors 29, in this embodiment, are preferably placed at the end of the long wall of divergence. By injecting a fluid into the nozzle 24, the direction of which is represented by the arrow 29/24, a deviation of the thrust vector produced by the nozzle and shown by the arrow F'2 is induced. The thrust F'1 provided by the half-nozzle 26 remains axial since nothing disrupts its direction. This results in the creation of a yaw moment relative to the center of gravity of the aircraft. This operating mode provides a substantial vectored thrust in order to control the aircraft, to the detriment however of the performance of the generator. This deterioration is however controlled.

One embodiment of the invention has been described. However, many variants are possible without departing from the context of the invention. For example, a channel has been shown supplied by a single gas generator. In the case of a twin-engined aircraft, the two half-flows of exhaust are generated by two distinct engines whose regulation is synchronized. Preferably, only the injectors in the divergence are used.

Variants of the arrangement and operation of the control means comprise the presence of a single control means. It is possible to operate it at the same time as the other means or separately.

According to an embodiment not shown, the nozzles may be of the fluid type with ejector, that is to say a secondary flow emerging in or downstream of the main channel.

The control means according to the invention may be combined partly with mechanical means of orienting the flows.

The invention claimed is:

1. A propulsion gas exhaust assembly, in an aircraft propelled by hot gases produced along an axis of the aircraft by a gas generator, comprising:

a transition element that emerges in first and second duct elements, each of the first and second duct element communicating with a first and second ejection half-nozzle, respectively, wherein each of the first and second duct elements includes an elbow disposed downstream of the transition element, each elbow is defined by a first portion that guides the gas flow in a radial direction away from the axis of the aircraft and a second portion disposed downstream of the first portion, the second portion of each elbow guiding the gas flow in a radial direction toward said axis of the aircraft such that the gas flow downstream of each elbow is returned to the axis, wherein elements disposed inside the duct that are upstream of the elbow are not visible when the assembly is viewed in an upstream direction from a location downstream of the first and second ejection half-nozzles.

2. The assembly as claimed in claim 1, wherein the first and second elbows are disposed in the same plane and are symmetrical with respect to each other.

3. The assembly as claimed in claim 1, wherein the gas generator is a gas turbine engine.

4. The assembly as claimed in claim 3, wherein the transition element comprises a cylindrical upstream portion.

5. The assembly as claimed in claim 4, wherein the cross section of the transition element changes toward the downstream, from the cylindrical cross section shape progressively to a shape with two adjacent elliptical cross sections.

6. The assembly as claimed in claim 5, wherein the elliptical cross section of the first and second duct elements includes a vertical or horizontal major axis.

7. The assembly as claimed in claim 1, wherein a main propulsion gas flow is divided into a first and a second flow in the first and second duct element, respectively, for an ejection into the first and the second half-nozzle, respectively, and the assembly further comprises at least one of a means of distributing the main flow into each of the two half-nozzles or a means of orienting the thrust vector produced by each of the two half-nozzles.

8. The assembly as claimed in claim 7, wherein said means of distributing and means of orienting are fluid injection or mechanical.

9. The assembly as claimed in claim 7, wherein said half-nozzles are placed for a yaw orientation of the thrust vector.

10. The assembly as claimed in claim 7, wherein said half-nozzles are placed for a pitch or roll control.

11. The assembly as claimed in claim 9, further comprising first and second pairs of half-nozzles, the first pair for the yaw orientation, the second pair for the pitch control.

12. The assembly as claimed in claim 8, wherein the means for controlling the distribution of the flows comprises means for fluid injection at a throat of each of the half-nozzles.

13. The assembly as claimed in claim 12, wherein the gas generator is a turboengine, and the fluid injection means are supplied by air tapped from a compressor of the generator.

14. The assembly as claimed in claim 7, wherein the main flow is generated by two gas generators, and the assembly further comprises a means of orienting the thrust vector produced by each of the two half-nozzles.

15. A turbomachine comprising an exhaust assembly as claimed in claim 1.

16. The assembly as claimed in claim 1, wherein $L_{elbow}/L_{channel}$ is between 0.5 and 0.7, wherein $L_{elbow}$ is a distance between an entrance plane of the transition element to a point where the elbow is at a maximum lateral deviation from the axis of the aircraft in an axial direction, and $L_{channel}$ is a distance between the entrance plane of the transition element to a throat of the half-nozzles in the axial direction.

17. The assembly as claimed in claim 1, wherein the first elbow is separate from the second elbow.

18. The assembly as claimed in claim 12, wherein the means for controlling the distribution of the flows further comprises means for fluid injection at an inner divergent wall of each of the half-nozzles.

* * * * *

UNITED STATES PATENT AND TRADEMARK OFFICE
CERTIFICATE OF CORRECTION

PATENT NO. : 7,681,400 B2  Page 1 of 1
APPLICATION NO. : 11/741393
DATED : March 23, 2010
INVENTOR(S) : Thomas Daris et al.

It is certified that error appears in the above-identified patent and that said Letters Patent is hereby corrected as shown below:

Col. 4, line 56, "$L_{int}/L_{ext} \geqq \frac{1}{2}$;" should read "$L_{int}/L_{ext} \geq \frac{1}{2}$;"

Col. 4, line 58, "$L_{ext}/L_{channel} \geqq \frac{1}{2}$;" should read "$L_{ext}/L_{channel} \geq \frac{1}{2}$;"

Col. 4, line 59, "$L_{separation}/L_{channel} \leqq 0.3$," should read "$L_{separation}/L_{channel} \leq 0.3$,"

Signed and Sealed this

Sixth Day of July, 2010

David J. Kappos
*Director of the United States Patent and Trademark Office*